(12) United States Patent
Singh et al.

(10) Patent No.: US 7,752,934 B2
(45) Date of Patent: Jul. 13, 2010

(54) MULTI SPEED TRANSMISSION HAVING A COUNTERSHAFT GEARING ARRANGEMENT

(75) Inventors: Tejinder Singh, Canton, MI (US); James D. Hendrickson, Belleville, MI (US); Henryk Sowul, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 505 days.

(21) Appl. No.: 11/676,862

(22) Filed: Feb. 20, 2007

(65) Prior Publication Data

US 2008/0196526 A1    Aug. 21, 2008

(51) Int. Cl.
 *F16H 3/08*    (2006.01)
(52) U.S. Cl. .............................. 74/331; 74/333; 74/340
(58) Field of Classification Search ................... 74/331, 74/333, 340
 See application file for complete search history.

(56) References Cited

U.S. PATENT DOCUMENTS

| | | | |
|---|---|---|---|
| 4,461,188 A * | 7/1984 | Fisher | 74/330 |
| 4,527,678 A * | 7/1985 | Pierce et al. | 192/3.58 |
| 4,790,418 A * | 12/1988 | Brown et al. | 701/51 |
| 5,613,401 A * | 3/1997 | Maurizio | 74/325 |
| 6,176,803 B1 | 1/2001 | Meyer | |
| 6,209,407 B1 | 4/2001 | Heinzel et al. | |
| 6,342,026 B1 | 1/2002 | Takagi | |
| 6,547,688 B2 | 4/2003 | Takagi | |
| 6,736,751 B1 | 5/2004 | Usoro | |
| 6,743,139 B1 | 6/2004 | Usoro | |
| 6,743,140 B1 | 6/2004 | Lee | |
| 6,743,142 B1 | 6/2004 | Lee | |
| 6,743,143 B1 | 6/2004 | Usoro | |
| 6,743,144 B1 | 6/2004 | Lee | |
| 6,746,357 B1 | 6/2004 | Usoro | |
| 6,752,736 B1 | 6/2004 | Lee | |
| 6,755,765 B2 | 6/2004 | Usoro | |
| 6,758,784 B2 | 7/2004 | Lee | |
| 6,758,787 B2 | 7/2004 | Usoro | |
| 6,764,424 B1 | 7/2004 | Usoro | |
| 6,764,425 B2 | 7/2004 | Lee | |
| 6,764,426 B2 | 7/2004 | Lee et al. | |
| 6,767,307 B1 | 7/2004 | Lee | |
| 6,811,512 B2 | 11/2004 | Usoro | |
| 6,837,823 B2 | 1/2005 | Lee | |
| 6,852,059 B2 | 2/2005 | Lee | |
| 6,958,028 B2 | 10/2005 | Janson et al. | |
| 6,960,149 B2 | 11/2005 | Ziemer | |
| 7,011,597 B2 | 3/2006 | Haka | |
| 7,014,589 B2 | 3/2006 | Stevenson | |

(Continued)

FOREIGN PATENT DOCUMENTS

DE    19807374 A1    2/1998

(Continued)

*Primary Examiner*—Ha D. Ho (57) ABSTRACT

A transmission is provided having a dual clutch, to achieve torque flow through a countershaft gearing arrangement. The countershaft gearing arrangement includes a plurality of co-planar gear sets having gears that are selectively connectable to a first and second countershaft. A transfer gear set transfers torque from the countershaft to an output shaft. The output shaft is connected to a final drive unit that has a final drive unit output shaft that is transverse to an input member connected at one end to a torque converter and at the other end to the dual clutch.

19 Claims, 3 Drawing Sheets

U.S. PATENT DOCUMENTS

| | | | |
|---|---|---|---|
| 7,021,169 B2 | 4/2006 | Kobayashi | |
| 7,044,014 B2 | 5/2006 | Janson et al. | |
| 7,077,025 B2 | 7/2006 | Janson et al. | |
| 7,080,567 B2 * | 7/2006 | Hatakeyama | 74/331 |
| 7,082,850 B2 | 8/2006 | Hughes | |
| 7,128,683 B2 | 10/2006 | Oguri | |
| 7,155,993 B2 | 1/2007 | Koenig et al. | |
| 7,155,994 B2 * | 1/2007 | Gumpoltsberger | 74/340 |
| 7,163,484 B2 | 1/2007 | Klemen | |
| 7,181,989 B2 | 2/2007 | Obinata | |
| 7,225,695 B2 * | 6/2007 | Gumpoltsberger et al. | 74/325 |
| 7,225,696 B2 * | 6/2007 | Gitt | 74/340 |
| 7,240,578 B2 | 7/2007 | Ogami et al. | |
| 7,246,534 B2 | 7/2007 | Kim et al. | |
| 7,255,018 B2 | 8/2007 | Gumpoltsberger | |
| 7,272,985 B2 | 9/2007 | Gumpoltsberger et al. | |
| 7,287,442 B2 * | 10/2007 | Gumpoltsberger | 74/331 |
| 7,311,015 B2 | 12/2007 | Kluge | |
| 7,313,981 B2 | 1/2008 | Gumpoltsberger | |
| 7,340,973 B2 | 3/2008 | Hiraiwa | |
| 7,383,749 B2 * | 6/2008 | Schafer et al. | 74/340 |
| 7,384,374 B2 | 6/2008 | Jiang | |
| 7,387,590 B2 | 6/2008 | Dreher | |
| 7,409,886 B2 * | 8/2008 | Gitt | 74/342 |
| 7,434,487 B2 | 10/2008 | Terai | |
| 7,437,963 B2 | 10/2008 | Haka et al. | |
| 7,448,290 B2 | 11/2008 | Gitt | |
| 7,461,567 B2 | 12/2008 | Ogami | |
| 2004/0144190 A1 | 7/2004 | Hall, III | |
| 2005/0000307 A1 | 1/2005 | Gumpoltsberger | |
| 2005/0103140 A1 | 5/2005 | Gumpoltsberger | |
| 2005/0115344 A1 | 6/2005 | Kim et al. | |
| 2005/0115345 A1 | 6/2005 | Gumpoltsberger et al. | |
| 2005/0193848 A1 | 9/2005 | Gitt | |
| 2005/0204840 A1 | 9/2005 | Soeda | |
| 2006/0019791 A1 | 1/2006 | Baldwin | |
| 2006/0048594 A1 | 3/2006 | Gumpoltsberger et al. | |
| 2006/0117882 A1 | 6/2006 | Gitt | |
| 2006/0169076 A1 | 8/2006 | Gumpoltsberger et al. | |
| 2006/0169077 A1 | 8/2006 | Gitt | |
| 2006/0219033 A1 | 10/2006 | Gitt | |
| 2006/0225527 A1 | 10/2006 | Yang et al. | |
| 2006/0266144 A1 | 11/2006 | Schafer et al. | |
| 2006/0270514 A1 | 11/2006 | Oguri | |
| 2006/0270516 A1 | 11/2006 | Klemen | |
| 2007/0022835 A1 | 2/2007 | Kilian et al. | |
| 2007/0113696 A1 | 5/2007 | Haka et al. | |
| 2007/0180942 A1 | 8/2007 | Antonov | |
| 2008/0047378 A1 | 2/2008 | Borgerson et al. | |
| 2008/0134820 A1 | 6/2008 | Bjorck et al. | |
| 2008/0141808 A1 | 6/2008 | Gumpoltsberger | |
| 2008/0196526 A1 | 8/2008 | Singh et al. | |
| 2008/0202266 A1 | 8/2008 | Hendrickson et al. | |
| 2008/0271555 A1 | 11/2008 | Patzner | |

FOREIGN PATENT DOCUMENTS

| | | |
|---|---|---|
| DE | 10310472 A1 | 3/2003 |
| DE | 102004055121 A1 | 5/2006 |
| DE | 102004056936 A1 | 6/2006 |
| DE | 102006016059 A1 | 10/2007 |
| DE | 102006016397 A1 | 10/2007 |
| EP | 1936234 A1 | 10/2007 |
| WO | WO2005021999 A1 | 3/2005 |
| WO | WO2005093289 A1 | 10/2005 |
| WO | WO2006056325 A2 | 6/2006 |
| WO | WO2006106534 A1 | 10/2006 |
| WO | WO2006128626 A1 | 12/2006 |
| WO | WO2007087855 A1 | 8/2007 |

* cited by examiner

MULTI SPEED TRANSMISSION HAVING A COUNTERSHAFT GEARING ARRANGEMENT

TECHNICAL FIELD

The invention relates to a multi-speed transmission having a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

SUMMARY

In an aspect of the present invention, a powertrain having a transmission input member, a power source for generating a torque in the input member, a first intermediate shaft a second intermediate shaft concentric with the first intermediate shaft,: a clutch, a first countershaft, a second countershaft, first set of gears, a second set of gears, an output shaft and first and second transfer gears is provided.

The first countershaft is radially spaced from the second intermediate shaft. The second countershaft is radially spaced from the second intermediate shaft. The clutch is selectively engagable to couple the transmission input member with one of the first and second intermediate shafts. The first set of gears are connected for common rotation with one of the first and second intermediate shafts and intermesh with a first selectable set of gears to form a first plurality of co-planar gear sets. Each of the gears of the first selectable set of gears is connectable for common rotation with at least one of the first and second countershafts for selectively transferring the torque to the countershafts when the clutch is engaged.

The second set of gears is connected for common rotation with the other of the first and second intermediate shafts and intermeshes with a second set of gears. The second set of gears are selectively connectable for common rotation with at least one of the countershafts to form a second plurality of co-planar gear sets for selectively transferring the torque to the countershafts when the clutch is engaged.

The output shaft is disposed radially outward of the second intermediate shaft. The first transfer gear is coupled to the first countershaft for transferring torque from the first countershaft to the output shaft. The second transfer gear is coupled to the second countershaft for transferring torque from the second countershaft to the output shaft.

In another aspect of the present invention, a co-planar gear set that provides a first gear ratio is adjacent one of the plurality of supporting walls.

In still another aspect of the present invention, a co-planar gear set that provides a second gear ratio is adjacent one of the plurality of supporting walls.

In yet another aspect of the present invention, a co-planar gear set that provides a third gear ratio is adjacent one of the plurality of supporting walls.

In yet another aspect of the present invention, a co-planar gear set that provides a fourth gear ratio is adjacent one of the plurality of supporting walls.

In yet another aspect of the present invention, a co-planar gear set that provides a fifth gear ratio is adjacent one of the plurality of supporting walls.

In yet another aspect of the present invention, a co-planar gear set that provides a sixth gear ratio is adjacent one of the plurality of supporting walls.

In yet another aspect of the present invention, a co-planar gear set that provides a seventh gear ratio is adjacent one of the plurality of supporting walls.

The above features and advantages and other features and advantages of the present invention are readily apparent from the following detailed description of the best modes for carrying out the invention when taken in connection with the accompanying drawings.

DESCRIPTION

Figure 1:
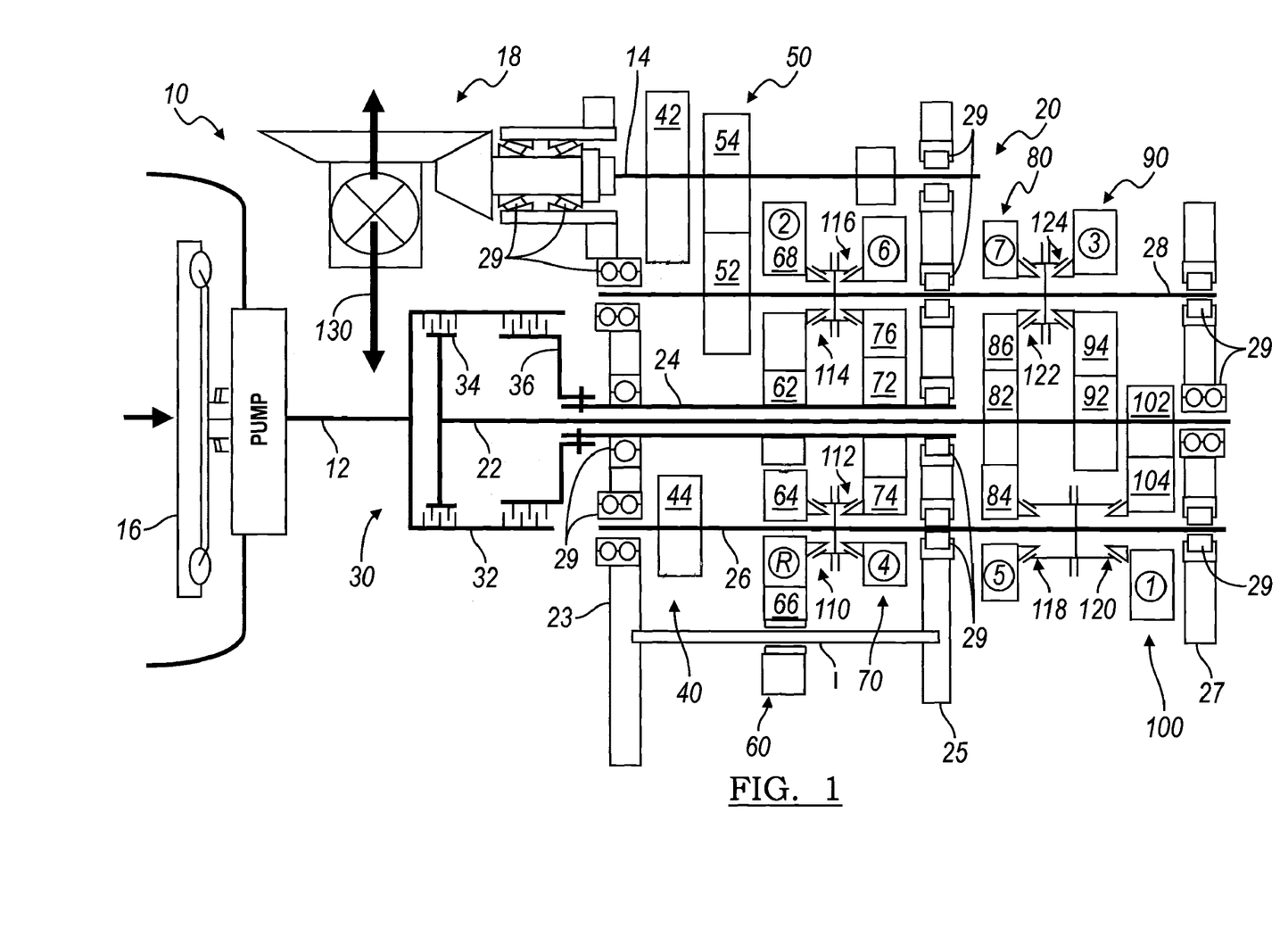
FIG. 1 is a schematic representation of a first embodiment of a transmission in accordance with the invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes intermediate shafts, countershafts, co-planar intermeshing gear sets and selectively engagable synchronizers as will be described herein. For instance, the countershaft gearing arrangement 20 includes a first intermediate shaft 22 and a second intermediate shaft 24, which is a sleeve shaft concentric with the first intermediate shaft 22. The countershaft gearing arrangement 20 further includes a first countershaft 26 and a second countershaft 28. The countershafts 26 and 28 are both spaced from and parallel with the input shaft 12, the output shaft 14 and the intermediate shafts 22, 24.

The first and second intermediate shafts 22, 24, first and second countershafts 26, 28 and output shaft 14 are supported by a first second and third support structure or wall 23, 25, 27 formed in the housing of transmission 10. As conventionally known, the walls 23. 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is packaged between input shaft 12 and first and second intermediate shafts 22, 24. The dual clutch 30 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34. 36 and clutch housing 32 have friction plates mounted thereon that interact to form a friction clutch. Further, clutch element 34 is connected for common rotation with first intermediate shaft 22 and clutch element 36 is connected for common rotation with second intermediate shaft 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 20 also includes co-planar, intermeshing gear sets 40, 50, 60, 70, 80, 90 and 100. Gear set 40 includes transfer gears 42 and 44. Gear 42 is connected for common rotation with output shaft 14 and intermeshes with gear 44. Gear 44 is connected for common rotation with first countershaft 26. As shown in FIG. 1, gear set 40 is disposed adjacent wall 23 and transfers torque from first countershaft 26 to output shaft 14.

Co-planar gear set 50 includes transfer gears 52 and 54. Transfer gear 52 is connected for common rotation with second countershaft 28 and intermeshes with gear 54. Transfer gear 54 is connected for common rotation with output shaft 14. As shown in FIG. 1, gear set 50 is disposed adjacent gear set 40 and transfers torque from second countershaft 28 to output shaft 14.

Gear set 60 includes co-planar intermeshing gears 62, 64, 66 and 68. Gear 62 is connected for common rotation with second intermediate shaft 24 and intermeshes with idler gear 66 and gear 68. Gear 64 is selectively connectable with first countershaft 26 and intermeshes with idler gear 66. Idler gear 66 is rotatable about idler axis I. Gear 68 is selectively connectable with second countershaft 28. As shown in FIG. 1, gear set 60 is disposed adjacent gear set 50 and provides second and reverse gear ratios.

Gear set 70 includes co-planar, intermeshing gears 72, 74 and 76. Gear 72 is connected for common rotation with second intermediate shaft 24. Gear 72 intermeshes with gears 74 and 76. Gear 74 is selectively connectable for common rotation with first countershaft 26. Gear 76 is selectively connectable for common rotation with second countershaft 28. As shown in FIG. 1, gear set 70 is disposed adjacent gear set 60 and wail 25 aid provides fourth and sixth gear ratios.

Gear set 80 includes co-planar, intermeshing gears 82, 84 and 86. Gear 82 is connected for common rotation with first intermediate shaft 22. Gear 82 intermeshes with gears 84 and 86. Gear 84 is selectively connectable with first countershaft 26. Gear 86 is selectively connectable with second countershaft 28. As shown in FIG. 1, gear set 80 is disposed adjacent wall 25 arid provides fifth and seventh gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with second countershaft 28. As shown in FIG. 1, gear set 90 is disposed adjacent gear set 80 and provides a third gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the first countershaft 26. As shown in FIG. 1, gear set 100 is disposed adjacent gear set 90 and wall 17 and provides a first gear ratio.

The transmission 10 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 64 with first countershaft 26 for common rotation therewith. Synchronizer 112 is selectively engagable to connect gear 74 with first countershaft 26 for common rotation therewith. Synchronizer 114 is selectively engagable to connect gear 68 with second countershaft 28 for common rotation therewith. Synchronizer 116 is selectively engagable to connect gear 76 with second countershaft 28 for common rotation therewith. Synchronizer 118 is selectively engagable to connect gear 84 with first countershaft 26 for common rotation therewith. Synchronizer 120 is selectively engagable to connect gear 104 with first countershaft 26 for common rotation therewith. Synchronizer 122 is selectively engagable to connect gear 86 with second countershaft 28 for common rotation therewith. Synchronizer 124 is selectively engagable to connect gear 94 with second countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio.

To establish the reverse torque ratio clutch element 36 of the dual clutch 30 and synchronizer 110 are engaged. By the engagement of clutch element 36 of the dual clutch 30, torque is transferred from the input shaft 12 through clutch housing 32 to the second intermediate shaft 24. Further, torque is transferred from the second intermediate shaft 24 through gear 62 to idler gear 66. Idler gear 66 transfers the torque to gear 64. Upon engagement of synchronizer 110, gear 64 transfers torque to first countershaft 26. First countershaft 26 transfers the torque to transfer gear 44. Transfer gear 44 transfers torque to transfer gear 42, which in turn transfers the torque to output shaft 14. Output shaft 14 transfers the torque to the final drive unit 18.

A first forward torque ratio ($1^{st}$ gear) is achieved by engaging clutch element 34 of the dual clutch 30 and synchronizer 120. By the engagement of clutch element 34 of the dual clutch 30, torque is transferred from input shaft 12 through clutch housing 32 to the first intermediate shaft 22. Further, torque is transferred from the first intermediate shaft 22 to gear 102. Gear 102 transfers the torque to gear 104. Upon engagement of synchronizer 120, gear 104 transfers torque to first countershaft 26. First countershaft 26 transfers the torque to transfer gear 44. Transfer gear 44 transfers torque to transfer gear 42, which in turn transfers the torque to output shaft 14. Output shaft 14 transfers the torque to the final drive unit 18.

A subsequent forward torque ratio ($2^{nd}$ gear) is established by engagement of clutch element 36 of the dual clutch 30 and synchronizer 114. By the engagement of clutch element 36 of the dual clutch 30, torque is transferred from input shaft 12 through clutch housing 32 to the second intermediate shaft 24. Further, torque is transferred from the second intermediate shaft 24 to gear 62. Gear 62 transfers the torque to gear 68. Upon engagement of synchronizer 114, gear 68 transfers torque to second countershaft 28. Second countershaft 28 transfers the torque to transfer gear 52. Transfer gear 52 transfers torque to transfer gear 54, which in turn transfers the torque to output shaft 14. Output shaft 14 transfers the torque to the final drive unit 18.

The subsequent torque ratio ($3^{rd}$ gear) is established by engagement of clutch element 34 of the dual clutch 30 and synchronizer 124. By the engagement of clutch element 34 of the dual clutch 30, torque is transferred from input shaft 12 through clutch housing 32 to the first intermediate shaft 22. Further, torque is transferred from the first intermediate shaft 22 to gear 92. Gear 92 transfers the torque to gear 94. Upon engagement of synchronizer 124, torque is transferred from gear 94 to second countershaft 28. Second countershaft 28 transfers the torque to transfer gear 52. Transfer gear 52 transfers torque to transfer gear 54, which in turn transfers the torque to output shaft 14. Output shaft 14 transfers the torque to the final drive unit 18.

The next subsequent forward torque ratio ($4^{th}$ gear) is established by engagement of clutch element 36 of the dual clutch 30 and synchronizer 112. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 74. Upon engagement of synchronizer 112, torque is transferred from gear 74 to first countershaft 26. First countershaft 26 transfers the torque to transfer gear 44. Transfer gear 44 transfers torque to transfer gear 42, which in turn transfers the torque to output shaft 14. Output shaft 14 transfers the torque to the final drive unit 18.

The subsequent torque ratio ($5^{th}$ gear) is established by engagement of clutch element 34 of the dual clutch 30 and synchronizer 118. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 84. Upon engagement of synchronizer 118, gear 84 transfers torque to first countershaft 26. First countershaft 26 transfers the torque to transfer gear 44. Transfer gear 44 transfers torque to transfer gear 42, which in turn transfers the torque to output shaft 14. Output shaft 14 transfers the torque to the final drive unit 18.

A subsequent forward torque ratio ($6^{th}$ gear) is established by engagement of clutch element 36 of the dual clutch 30 and synchronizer 116. By the engagement of clutch element 36 of the dual clutch 30, torque is transferred from input shaft 12 through clutch housing 32 to the second intermediate shaft 24. Further, torque is transferred from the second intermediate shaft 24 to gear 72. Gear 72 transfers the torque to gear 76. Upon engagement of synchronizer 116, torque is transferred from gear 76 to the second countershaft 28. Second countershaft 23 transfers the torque to transfer gear 52. Transfer gear 52 transfers torque to transfer gear 54, which in turn transfers the torque to output shaft 14. Output shaft 14 transfers the torque to the final drive unit 18.

The subsequent torque ratio ($7^{th}$ gear) is established by engagement of clutch element 34 of the dual clutch 30 and synchronizer 122. By the engagement of clutch element 34 of the dual clutch 30, torque is transferred from input shaft 12 through clutch housing 32 to the first intermediate shaft 22. Further, torque is transferred from the first intermediate shaft 22 to gear 82. Gear 82 transfers the torque to gear 86. Upon engagement of synchronizer 122, torque is transferred from gear 86 to second countershaft 28. Second countershaft 28 transfers the torque to transfer gear 52. Transfer gear 52 transfers torque to transfer gear 54, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 42, 44, 52, 54 in two separate planes. This arrangement provides the opportunity to achieve the desired gear ratios. Further, flexibility is provided in the selection of gear ratios with respect to $1^{st}$ gear and $3^{rd}$ gear, as the gears (102, 104, 92 and 94) that provide these ratios are disposed in two separate planes, and do not share the same pinion gears (i.e. pinion gear 92 does not mesh with gears 102 and/or 104). An overall transmission length reduction is achieved using idler gear 66, which is disposed in a single plane.

Second Embodiment

Figure 2:
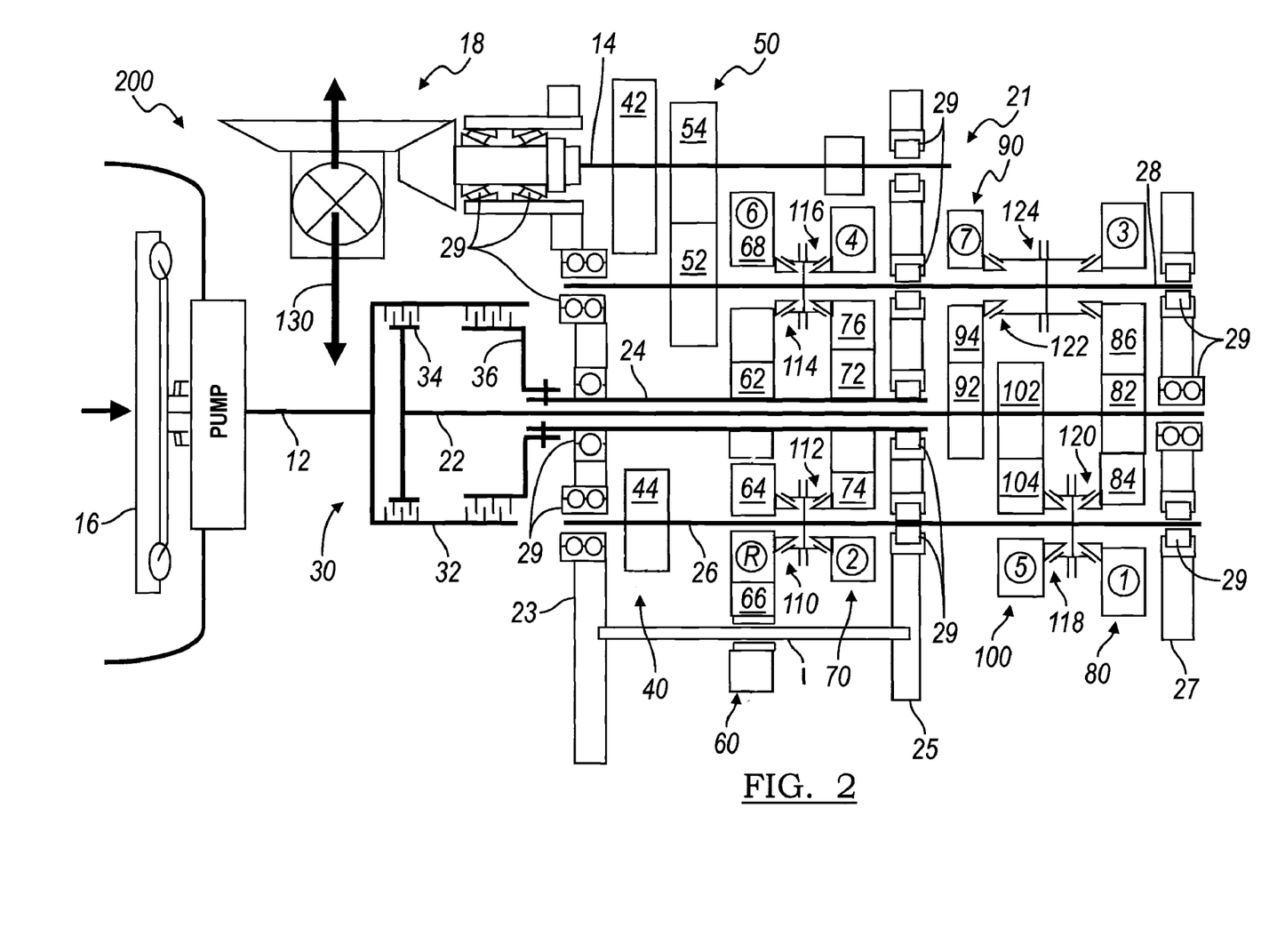
FIG. 2 is a schematic representation of a second embodiment of a transmission in accordance with the invention.

Referring to FIG. 2 a multi-speed transmission 200 is depicted. The transmission 200 includes an input member 12 and output member 14. In the present embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 200 includes a countershaft gearing arrangement 21 that includes intermediate shafts, countershafts, co-planar intermeshing gear sets and selectively enagable synchronizers as will be described herein. For instance, the countershaft gearing arrangement 21 includes a first intermediate shaft 22 and a second intermediate shaft 24, which is a sleeve shaft concentric with the first intermediate shaft 22. The countershaft gearing arrangement 21 further includes a first countershaft 26 and a second countershaft 28. The countershafts 26 and 28 are both spaced from and parallel with the input shaft 12, the output shaft 14 and the intermediate shafts 22, 24.

The first and second intermediate shafts 22, 24, first and second countershafts 26, 28 and output shaft 14 are supported by a first, second and third support structure or wall 23, 25, 27 formed in the housing of transmission 200. As conventionally known, the walls 23, 25, 27 are fitted with bearings 29 for rotatably supporting the first and second intermediate shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second intermediate shafts 22, 24. The dual clutch 310 includes a clutch housing 32 connected for common rotation with input shaft 12. Further, clutch 30 has a first and a second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further clutch element 34 is connected for common rotation with first intermediate shaft 22 and clutch element 36 is connected for common rotation with second intermediate shall 24. Thus, selective engagement of clutch element 34 with clutch housing 32, connects the input shaft 12 for common rotation with first intermediate shaft 22 and selective engagement of clutch element 36 with clutch housing 32, connects the input shaft 12 for common rotation with second intermediate shaft 24.

The countershaft gearing arrangement 21 also includes co-planar, intermeshing gear sets 40, 50, 60, 70, 80, 90 and 100. Gear set 40 includes transfer gears 42 and 44. Gear 42 is connected for common rotation with output shaft 14 and intermeshes with gear 44. Gear 44 is connected for common rotation with first countershaft 26. As shown in FIG. 2, gear set 40 is disposed adjacent wall 23 and transfers torque from first countershaft 26 to output shaft 14.

Co-planar gear set 50 includes transfer gears 52 and 54. Transfer gear 52 is connected for common rotation with second countershaft 28 and intermeshes with gear 54. Transfer gear 54 is connected for common rotation with output shaft 14. As shown in FIG. 2, gear set 50 is disposed adjacent gear set 40 and transfers torque from second countershaft 28 to output shaft 14.

Gear set 60 includes co-planar intermeshing gears 62, 64, 66 and 68. Gear 62 is connected for common rotation with second intermediate shaft 24 and intermeshes with idler gear 66 and gear 68. Gear 64 is selectively connectable with first countershaft 26 and intermeshes with idler gear 66. Idler gear 66 is rotatable about idler axis I. Gear 68 is selectively connectable with second countershaft 28. As shown in FIG. 2, gear set 60 is disposed adjacent gear set 50 and provides sixth and reverse gear ratios.

Gear set 70 includes co-planar, intermeshing gears 72, 74 and 76. Gear 72 is connected for common rotation with second intermediate shaft 24. Gear 72 intermeshes with gears 74 and 76. Gear 74 is selectively connectable for common rotation with first countershaft 26. Gear 76 is selectively connectable for common rotation with second countershaft 28. As shown in FIG. 2, gear set 70 is disposed adjacent gear set 60 and wall 25 and provides second and fourth gear ratios.

Gear set 80 includes co-planar, intermeshing gears 82, 84 and 86. Gear 82 is connected for common rotation with first intermediate shaft 22. Gear 82 intermeshes with gears 84 and 86. Gear 84 is selectively connectable with first countershaft 26. Gear 86 is selectively connectable with second countershaft 28. As shown in FIG. 2, gear set 80 is disposed adjacent wall 27 and provides first and third gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with second countershaft 28. As shown in FIG. 2, gear set 90 is disposed adjacent wall 25 and provides a seventh gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the first countershaft 26. As shown in FIG. 2 gear set 100 is disposed between gear set 80 and gear set 90 and provides a fifth gear ratio.

The transmission 200 further includes a plurality of selectively engagable synchronizers 110, 112, 114, 116, 118, 120, 122 and 124. Synchronizers 110/112, 114/116, 118/120 and 122/124 are a left and right side of synchronizer assemblies, sharing a common synchronizer hub and sleeve. Synchronizer 110 is selectively engagable to connect gear 64 with first countershaft 26 for common rotation therewith. Synchronizer 112 is selectively engagable to connect gear 74 with first countershaft 26 for common rotation therewith. Synchronizer 114 is selectively engagable to connect gear 68 with second countershaft 28 for common rotation therewith. Synchronizer 116 is selectively engagable to connect gear 76 with second countershaft 28 for common rotation therewith. Synchronizer 118 is selectively engagable to connect gear 104 with first countershaft 26 for common rotation therewith. Synchronizer 120 is selectively engagable to connect gear 84 with first countershaft 26 for common rotation therewith. Synchronizer 122 is selectively engagable to connect gear 94 with second countershaft 28 for common rotation therewith. Synchronizer 124 is selectively engagable to connect gear 86 with second countershaft 28 for common rotation therewith. Further, the desired gear ratio is achieved by arranging transfer gears in two separate planes, and by using to separate pinion gears (i.e. pinion gears 92 and 102) to achieve the $5^{th}$ and $7^{th}$ gear ratios. Moreover, an overall transmission length reduction is achieved by utilizing a reverse gear (i.e. gear 66) that is disposed in a single plane.

The transmission 200 is capable of transmitting torque from the input shaft 12 to the output shaft 14 in at least seven forward torque ratios and one reverse torque ratio, as indicated in FIG. 2. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque or speed ratios are achieved, based on the description of transmission 10 above.

Third Embodiment

Figure 3:
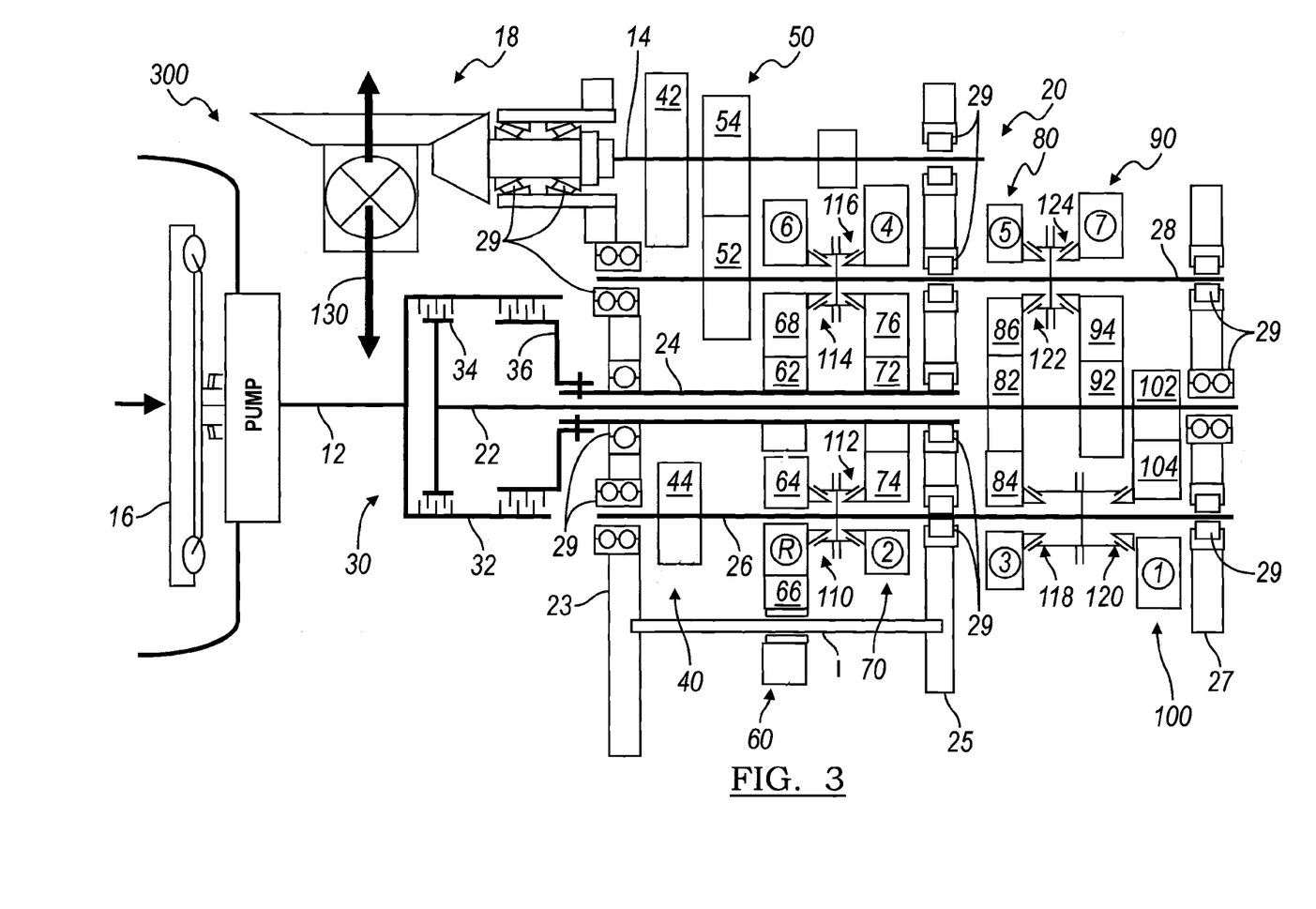
FIG. 3 is a schematic representation of a third embodiment of a transmission in accordance with the invention.

Referring to FIG. 3 a multi-speed transmission 300 is depicted. The transmission 300 includes an input member 12 and output member 14 a torque converter 16, a final drive unit 18, and a countershaft gearing arrangement 20 that includes intermediate shafts, countershafts, co-planar intermeshing gear sets mad selectively engagable synchronizers as shown in FIG. 1, and described above. However, the speed and torque ratios provided by the co-planar intermeshing gear sets are provided on the various gear sets as described in detail below.

Gear sets 40, and 50 are transfer gears sets and provide the same function as described above with respect to the embodiment illustrated in FIG. 1.

Gear set 60 includes co-planar intermeshing gears 62, 64, 66 and 68. Gear 62 is connected for common rotation with second intermediate shaft 24 and intermeshes with idler gear 66 and gear 68. Gear 64 is selectively connectable with first countershaft 26 and intermeshes with idler gear 66. Idler gear 66 is rotatable about idler axis I. Gear 68 is selectively connectable with second countershaft 28. As shown in FIG. 3, gear set 60 is disposed adjacent gear set 50 and provides sixth and reverse gear ratios.

Gear set 70 includes co-planar, intermeshing gears 72, 74 and 76. Gear 72 is connected for common rotation with second intermediate shaft 24. Gear 72 intermeshes with gears 74 and 76. Gear 74 is selectively connectable for common rotation with first countershaft 26. Gear 76 is selectively connectable for common rotation with second countershaft 28. As shown in FIG. 3, gear set 70 is disposed adjacent gear set 60 and wall 25 and provides second and fourth gear ratios.

Gear set 80 includes co-planar, intermeshing gears 82, 84 and 86. Gear 82 is connected for common rotation with first intermediate shaft 22. Gear 82 intermeshes with gears 84 and 86. Gear 84 is selectively connectable with first countershaft 26. Gear 86 is selectively connectable with second countershaft 28. As shown in FIG. 3, gear set 80 is disposed adjacent wall 25 and provides fifth and third gear ratios.

Gear set 90 includes co-planar, intermeshing gears 92 and 94. Gear 92 is connected for common rotation with first intermediate shaft 22. Gear 92 intermeshes with gear 94. Gear 94 is selectively connectable for common rotation with second countershaft 28. As shown in FIG. 3, gear set 90 is disposed between gear sets 80 and 100 provides a seventh gear ratio.

Gear set 100 includes co-planar, intermeshing gears 102 and 104. Gear 102 is connected for common rotation with first intermediate shaft 22. Gear 102 intermeshes with gear 104. Gear 104 is selectively connectable for common rotation with the first countershaft 26. As shown in FIG., 3, gear set 100 is disposed adjacent gear set 90 and wall 27 and provides a first gear ratio.

As in the transmission 10, transmission 300 is capable of transmitting torque from the input shaft 12 to the output shaft 14 in at least seven forward torque ratios and one reverse torque ratio, as indicated in FIG. 3. Each of the forward torque ratios and the reverse torque ratio is attained by engagement of dual clutch 30 and one of the clutch elements 34, 36 and one or more of the synchronizers 110, 112, 114, 116, 118, 120, 122 and 124. Those skilled in the art will readily understand that a different speed ratio is associated with each torque ratio and how these torque or speed ratios are achieved, based on the description of transmission 10 above. Advantageously, the desired gear ratio is achieved by arranging the transfer gears (i.e. gears 42, 44, 52 and 54) in two separate planes, and by using separate pinion gears to achieve the $1^{st}$ and $7^{th}$ gear ratios. Moreover, an overall transmission length reduction is achieved by utilizing a reverse gear that is disposed in a single plane.

Accordingly, the present embodiments of the invention have many advantages and benefits over the prior art. For example, the transmission of the present invention provides the final drive unit 18 with a final drive unit output shaft 130. Moreover, the final drive unit output shaft 130 is transverse or perpendicular to input member 12 and is disposed between the torque converter 16 and clutch 30.

While the best modes for carrying out the invention have been described in detail, those familiar with the art to which this invention relates will recognize various alternative designs and embodiments for practicing the invention within the scope of the appended claims.

The invention claimed is:

1. A powertrain comprising:
a transmission input member;
a power source for generating a torque in the input member;
a first intermediate shaft;
a second intermediate shaft concentric with the first intermediate shaft;
a clutch selectively engagable to couple the transmission input member with one of the first and second intermediate shafts;
a first countershaft radially spaced from the second intermediate shaft;
a second countershaft radially spaced from the second intermediate shaft;
a first set of pinion gears having only a first pinion gear and a second pinion gear each connected for common rotation with the second intermediate shaft and intermeshing with a first set of selectable gears to form a first plurality of co-planar gear sets, wherein each of the gears of the first set of selectable gears is selectively connectable for common rotation with at least one of the first and second countershafts for selectively transferring the torque to the at least one of the first and second countershafts when the clutch is engaged, and wherein the first plurality of co-planar gear sets provides a second gear ratio, a fourth gear ratio, and a sixth gear ratio;
a second set of pinion gears having only a third pinion gear, a fourth pinion gear, and a fifth pinion gear each connected for common rotation with the first intermediate shaft and intermeshing with a second set of selectable gears selectively connectable for common rotation with at least one of the first and second countershafts to form a second plurality of co-planar gear sets for selectively transferring the torque to the at least one of the first and second countershafts when the clutch is engaged, and wherein the second plurality of co-planar gear sets provides a first gear ratio, a third gear ratio, a fifth gear ratio, and a seventh gear ratio;
an idler gear intermeshing with one of the co-planar gear sets of the first plurality of gear sets, wherein the idler gear is supported by an idler shaft;
an output shaft disposed radially outward of the second intermediate shaft;
a first transfer gear coupled to the first countershaft for transferring torque from the first countershaft to the output shaft; and
a second transfer gear coupled to the second countershaft for transferring torque from the second countershaft to the output shaft, and
wherein the first pinion gear meshes with the idler gear and with a first selectable gear of the first set of selectable gears.

2. The powertrain of claim 1 wherein the clutch is a dual clutch having a first clutch hub connected to the first intermediate shaft and a second clutch hub connected to the second intermediate shaft.

3. The powertrain of claim 1 further comprising a housing having a plurality of supporting walls for supporting the first and second intermediate shafts, the first and second countershafts, the input member, and the output shaft.

4. The powertrain of claim 3 wherein the co-planar gear set that provides the second gear ratio is adjacent one of the plurality of supporting walls.

5. The powertrain of claim 3 wherein the co-planar gear set that provides the fourth gear ratio is adjacent one of the plurality of supporting walls.

6. The powertrain of claim 3 wherein the co-planar gear set that provides the sixth gear ratio is adjacent one of the plurality of supporting walls.

7. The powertrain of claim 3 wherein the co-planar gear set that provides the first gear ratio is adjacent one of the plurality of supporting walls.

8. The powertrain of claim 7 wherein the co-planar gear set that provides the first gear ratio includes a pinion gear that meshes with only a single gear of the second set of selectable gears.

9. The powertrain of claim 3 wherein the co-planar gear set that provides the fifth gear ratio is adjacent one of the plurality of supporting walls.

10. The powertrain of claim 3 wherein the co-planar gear set that provides the fifth gear ratio further includes a pinion gear that meshes with only a single gear of the second set of selectable gears.

11. The powertrain of claim 3 wherein the co-planar gear set that provides the third gear ratio is adjacent one of the plurality of supporting walls.

12. The powertrain of claim 3 wherein the co-planar gear set that provides the third gear ratio further includes a pinion gear that meshes with only a single gear of the second set of selectable gears.

13. The powertrain of claim 3 wherein the co-planar gear set that provides the seventh gear ratio is adjacent one of the plurality of supporting walls.

14. The powertrain of claim 13 wherein the co-planar gear set that provides the seventh gear ratio further includes a pinion gear that meshes with only a single gear of the second set of selectable gears.

15. The powertrain of claim 1 wherein the co-planar gear sets that provide the first and seventh gear ratios further includes two pinion gears disposed in two separate planes and independently meshes with two separate gears of the second set of selectable gears.

16. The powertrain of claim 1, wherein the second pinion gear meshes with a second selectable gear of the first set of selectable gears that is selectively connectable for common rotation with the first countershaft, and the second pinion gear meshes with a third selectable gear of the first set of selectable gears that is selectively connectable for common rotation with the second countershaft.

17. The powertrain of claim 1, wherein the third pinion gear meshes with a first selectable gear of the second set of selectable gears that is selectively connectable for common rotation with the first countershaft, and the third pinion gear meshes with a second selectable gear of the second set of selectable gears that is selectively connectable for common rotation with the second countershaft.

18. The powertrain of claim 17, wherein the fourth pinion gear meshes with only a third selectable gear of the second set of selectable gears and the fifth pinion gear meshes with only a fourth selectable gear of the second set of selectable gears.

19. The powertrain of claim 18, wherein the second intermediate shaft is a sleeve shaft and the first intermediate shaft is at least partially disposed within the second intermediate shaft.

\* \* \* \* \*